United States Patent

Winkler

[15] 3,686,366
[45] Aug. 22, 1972

[54] HYDROHALOGENATED SELECTIVELY HYDROGENATED BLOCK COPOLYMERS

[72] Inventor: Deloss E. Winkler, 133 Lombardy Lane, Orinda, Calif. 94563

[73] Assignee: Shell Oil Company, New York, N.Y.

[22] Filed: July 22, 1970

[21] Appl. No.: 57,364

[52] U.S. Cl. ............260/880 B, 260/96 HY, 260/879
[51] Int. Cl. .......C08f 19/08, C08f 27/02, C08f 27/25
[58] Field of Search ..........................260/880 B, 879

[56] References Cited

UNITED STATES PATENTS

| | | | |
|---|---|---|---|
| 3,431,323 | 3/1969 | Jones | 260/880 |
| 3,452,118 | 6/1969 | Winkler et al. | 260/879 |

*Primary Examiner*—James A. Seidleck
*Attorney*—William H. Myers and Martin S. Baer

[57] ABSTRACT

Block copolymers of improved fire resistance are provided by block polymerizing a monovinyl arene with butadiene, the butadiene polymer block containing between about 20 percent and about 60 percent 1,2 microstructure, then selectively partially hydrogenating so as to eliminate at least about 50 percent of the 1,2 unsaturation and no more than about 50 percent of the 1,4 unsaturation and thereafter reacting substantially completely with a hydrogen halide. The monovinyl arene polymer blocks are essentially unreactive toward hydrogen or hydrogen halide under the conditions used.

7 Claims, No Drawings

HYDROHALOGENATED SELECTIVELY HYDROGENATED BLOCK COPOLYMERS

BACKGROUND OF THE INVENTION

This invention is concerned with the production of block copolymers. More specifically, it is directed to the preparation of hydrohalogenated block copolymers that are fire resistant, and have high strength because of their self-vulcanizing properties.

A special class of copolymers has been developed in the last few years that are generically referred to as block copolymers. More specifically, a class of block copolymers has been provided that has the general structure A—B—(—B—A)$_n$, where $n$ is a small integer from 1 to about 6, and wherein the A polymer blocks are monovinyl arene polymer blocks, typified by polystyrene, and the B blocks are conjugated diene polymer blocks. The block copolymers are usually thermoplastic and may be elastomers or plastics depending on the chemical identity of the several blocks and their relative proportions. These block copolymers have unique properties, one of which is that they are self-curing, i.e., they achieve high strength and other useful properties without requiring chemical vulcanization.

The state of the art of forming block copolymers has advanced rapidly in the last few years. A number of block copolymer types have been proposed that may have two or more polymer blocks, may be essentially linear, or may be branched near one end of the molecule. These polymers may be produced by a variety of processes, such as by sequential addition of the individual monomers to form the individual polymer blocks or by a combination of sequential addition and coupling. When coupling is desired, the choice of the coupling agent has been found to be important in creating the desired structure, i.e., linear or multibranched. Also, derivatives of these block polymers have been made by adding various chemical compounds to the olefinic double bonds, for example, by adding hydrogen to improve oxidative stability and service temperatures, or by installing polar radicals to adjust solubility in various solvents or permeability to water or with other objectives. The set of properties required may be tailor-made by choosing among various alternatives, including chemical identity of the polymer blocks, individual block molecular weights, ratio of the different species of blocks, total molecular weight, the factors mentioned above, and other variables.

When a self-vulcanizing, elastomeric block copolymer is desired, a conjugated diene is often preferred as the monomer to form the predominating part of the middle polymer block. Hard, thermoplastic, non-elastomeric block copolymers are made using as the predominant monomer a substance, such as styrene or alpha methyl styrene, normally capable of forming a thermoplastic resin when homopolymerized. By judicious selection among the factors noted above, especially the relative individual block molecular weights, the whole set of products from highly elastic to highly plastic types can be prepared. According to the prior art, a simple structure such as A-B-A, in which A is a monovinyl arene polymer block and B is a conjugated diene polymer block, will have elastomeric properties, and be thermoplastic, if the A polymer blocks constitute less than about 50 percent weight of the entire weight of the polymer molecule.

Insertion of conjugated diene monomer molecules into the conjugated diene block occurs in several ways, using lithium based catalysts, preferably lithium alkyls, employed according to the prior art. A mixture of several types of polymer microstructures, known as cis 1,4-, trans 1,4- and 1,2 microstructures is formed, referring to the manner in which the catalyst attacked the diene units. In the cis 1,4- and trans 1,4- structures in the polymer, carbon arrangement is all in a line and no small side chains are formed. In the 1,2 structures two-carbon vinyl groups are present as short side chains directly attached to the two remaining carbon atoms of the original diene monomer units; these two-carbon branches are often known as pendant vinyl groups, since they seem to dangle from the backbone chain. All three types of microstructures are often present in a diene polymer block, but conditions are known in the art to maximize any of the three types if so desired.

As noted above, one of the directions of development in the art of block copolymers is the formation of derivatives by installing polar radicals at various locations on the polymer chain. A number of reactions are known for this purpose, such as hydrohalogenation, carboxylation, epoxidation, hydroxylation and the like. The polar derivatives so formed would be useful for many commercial purposes, but their instability to heat or light when an effective proportion of polar radicals is present often causes them to lose their desirable physical properties. Instability of these derived polymers is a major obstacle to their commercialization, and its source is the installation of polar radicals in the pendant vinyl groups or on tertiary carbon atoms in the main backbone carbon chain. In these situations ready decomposition of the molecule or cyclization of portions thereof can occur, leading to a product having relatively little commercial utility.

Instability is also an undesirable property of the product from adding hydrogen chloride to homopolymer polyisoprene of high cis 1,4 microstructure. By simple addition to the olefinic double bonds, hydrogen chloride yields tertiary chloride groups that are easily and spontaneously removed in later exposures to heat and light, rendering the product unstable. During hydrogen chloride exposures, homopolymer polybutadiene of high 1,2 microstructure, with its many pendant vinyl groups, undergoes cyclization first and then tertiary chloride formation by addition to form a product that is also unstable to heat and light.

In using halogen hydrides to install halogen atoms in certain block copolymers containing only diene polymer blocks, care is necessary not to overhalogenate. The hard, plastic-like, high chlorine content products characteristic of chlorinated rubber and other halogenated polymers must be avoided by selecting the proper structures for the blocks and by limiting the chlorine content.

Production of fire resistant and self-extinguishing polymers has been the objective of many investigators. Halogen containing polymers supplemented with various additives, such as phosphorus or antimony compounds, are often described. Elastomeric, self extinguishing compositions made from compounded elastomeric homopolymer are know, but they all require vulcanization to achieve desirable commercial properties, and they all suffer from the deficiency that, because it is vulcanized, misprocessed material must be degraded to the scrap heap. To our knowledge elastomeric, self extinguishing products that can be repeatedly molded and remolded without loss in strength and other desirable physical properties have not been known until the present invention.

OBJECTS OF THE INVENTION

It is the object of the present invention to provide improved block copolymers. It is a further object of this invention to provide hydrohalogenated block copolymers. It is a special object of this invention to provide hydrohalogenated block copolymers of greatly improved stability and fire resistance. Other objects will become apparent during the following detailed description of the invention.

STATEMENT OF THE INVENTION

Now, in accordance with this invention, a block copolymer is provided comprising a hydrohalogenated, partially hydrogenated block copolymer having, prior to hydrohalogenation and hydrogenation, at least one monovinyl arene polymer block and at least one polybutadiene polymer block wherein the 1,2 microstructure is between about 20 and about 60 percent as shown by infrared absorbance at 10.98 microns and 10.05 microns, the balance of the polybutadiene polymer block being 1,4- structured, said block copolymer being selectively hydrogenated before hydrohalogenation so as to remove at least about 50 percent of the unsaturation in the pendant vinyl groups (i.e., the 1,2 microstructure) and no more than about 50 percent of the unsaturation in the 1,4 structured portions of the polybutadiene block, and then being substantially completely hydrohalogenated.

The hydrohalogenated block copolymers of his invention therefore have polyvinyl arene end blocks that are not substituted, either by hydrogen or hydrogen halide, and elastomeric polymer blocks that have been made by reacting diene polymer blocks with hydrogen and then hydrogen halide. The substantial elimination of unsaturation in the pendant vinyl groups and in some of the 1,4 microstructures before hydrohalogenation almost completely avoids cyclization reactions and formation of tertiary halide radicals when hydrogen halide is added later.

The objects of the invention are thus satisfied, since the chemical structures of the hydrohalogenated, partially hydrogenated polymers resist decomposition by heat and light, and have improved fire resistance. Moreover, the block copolymers of this invention are thermoplastic and self-vulcanizing, i.e., they do not require vulcanization to achieve elastomeric properties; they can be repeatably melted, molded and cooled, but they regain their good physical properties again when cooled. Furthermore, misprocessed material can be recycled through the heating and forming operation because these block copolymers are thermoplastic and stable, in contrast to vulcanized rubber technology, in which misprocessed parts are degraded to the scrap heap and require extensive chemical treatment to make them useful.

The preparation of the precursor block copolymer (before hydrogenation or hydrohalogenation) may follow processes broadly known in the block polymer art. The precursor products will have the general formula $A-B-(-BA)_{0-5}$. In this formula each A represents a monovinyl arene polymer block and each B a polybutadiene block. Where at any point two essentially identical B blocks are directly connected, except possibly for the residue of a coupling agent, the connected blocks are considered to be a single block for the purposes of describing molecular weights, responses to chemical addition reactions and the like. When the subscript n equals 0 in the above formula, a two block polymer A—B is meant. When n equals 1, an A—B—A structure of linear form is intended. Branched structures are designated when $n$ is between 2 and 5; for example, where a tetrafunctional coupling agent is used the structure would be represented

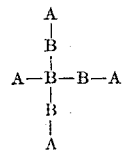

It will be understood that these general formulas have been written to include either sequentially formed species or species that have been formed, at least in part, by the use of coupling agents. In the latter instance any residue of the coupling agents has been ignored as being an insignificant part of these general formula for high molecular weight polymers. Thus, the presence of a single silicon atom from a silicon tetrachloride coupling reaction in a tetra branched polymer having a molecular weight of 100,000 would be insignificant in terms of structure or physical properties. Other types of coupling residues would similarly be only a very small part of the total molecule.

Typical monovinyl arene polymer blocks A are prepared from styrene, alpha methyl styrene, ring alkylated styrenes and the like, or mixtures thereof. Styrene and alpha methyl styrene are preferred monomers. They may be modified by minor proportions, based on the monovinyl arene, of copolymerizable monomers that have conjugated double bonds such as conjugated dienes, vinyl pyridines and the like.

Solution polymerization is preferred to make the precursor block copolymers, using lithium based catalysts that may be monofunctional, for example, lithium alkyls, or polyfunctional, for example, dilithionaphthalene. The monomers are dissolved in inert solvents, such as alkenes, alkanes, cycloalkenes or cycloalkanes such as butenes, pentenes, butanes, pentanes, cyclopentene, cyclopentane or cyclohexane, as well as their mixtures. Anaerobic conditions are essential and reactive impurities must be removed from both the highly purified monomers and the solvents by scavenging the impurities with very carefully measured quantities of the polymerizing initiator. For example, a solution of purified styrene in dry cyclohexane is treated with small amounts of lithium alkyl to the point of incipient polymerization, after which a quantity of lithium alkyl, such as secondary butyl lithium, is added that is sufficient to cause polymerization to a polymer block of appropriate molecular weight, with the lithium ion always present associated with the carbanion on the end of the growing chain. A second monomer, such as butadiene, and later a third monomer, if desired, is added to form subsequent polymer blocks, being careful in each instance that the previous monomer is consumed by polymerization or any excess removed, and that the new monomer is carefully scavenged of impurities but not polymerizing of itself before adding it to the block copolymer already produced.

In this way, a two block polymer A—B may be formed and used as is, or coupled, or made into a three block polymer with more monomer, all within the scope of this invention. The A—B—Li polymer may be coupled to form a linear A—B—B—A structure with a dihaloethane or it may be joined multiply to form a star-shaped, radial, branched or nonlinear structure (depending on the nomenclature desired) using a polyfunctional coupling agent such as silicon tetrahalide, diesters of dicarboxylic acids and monohydric alcohols like diethyl adipate and other coupling agents known to the art.

The average molecular weight of each A polymer block in the configurations described above may be from about 8,000 to about 45,000, while the B polymer block may have average molecular weights from about 35,000 to about 150,000, preferably 50,000 to 125,000, the proportion of A blocks being from about 5 to about 70 percent of the total average molecular weight of the block copolymer. The properties of the block copolymers will therefore range from highly elastomeric, snappy rubbers at low A polymer block percentages to slow recovering elastomers or even products with plastic character at high A polymer block percentages.

During polymerization to secure these structures, control must be exercised to achieve the content of 1,2 microstructure desired in the polybutadiene block. The 1,2 microstructure or pendant vinyl group content is easily controlled by including in the reaction mixture, at least during the formation of the polybutadiene block, a nucleophilic polar substance such as an ether or secondary amine. Typical polar substances are tetrahydrofurane, anisole and triethylamine. Amounts required will depend on the amount of 1,2 microstructure desired. For the range of about 20 to about 60 percent 1,2 microstructure required in the block copolymers to be hydrogenated for the present invention, it is necessary to use between about 2 and 50 moles of tetrahydrofurane or triethylamine per mole of lithium ion in the reaction mixture. Block copolymers made in the absence of one of these polar substances will have too little 1,2 microstructure; those made with too much polar substance present will contain too high a proportion of the polybutadine units in the 1,2 configuration. These limitations are necessary because the finished product of this invention, that is, the block copolymer after hydrogenation and hydrohalogenation, will have much poorer elastomeric properties if the 1,2 content of the precursor polymer is too low or too high.

The block copolymer produced by polymerization is selectively hydrogenated under conditions chosen so that at least about 50 percent of the pendant vinyl groups will be hydrogenated, preferably that 60–100 percent of such groups are hydrogenated, and that the monovinyl arene polymer blocks will not be hydrogenated. Some of the 1,4 structured double bonds in the backbone carbon chain of the polybutadiene block will be unavoidably hydrogenated at the same time, but saturation of these internal double bonds must be held to a minimum of less than about 50 percent and preferably less than 25 percent of those present before hydrogenation. Block copolymers in which only 30 percent of all the diene polymer units were hydrogenated are useful in the practice of this invention. Hydrogenation is preferably done by dissolving the precursor block copolymer in an inert solvent, usually the polymerization solvent, adding a cobalt, nickel or iron carboxylate or alkoxide reduced with an aluminum alkyl compound and pressuring with hydrogen to between 50 psig and 500 psig at mild temperatures of 20° to 50° C. The selective hydrogenation proceeds to the extent desired in about 0.1 to 1 hours.

The product from hydrogenation may be examined by infrared analysis to determine the relative absorbance at 10.05 and 10.98 microns (1,2 microstructure), 10.35 microns (trans 1,4 microstructure) and 13.60 microns (cis 1,4 microstructure). It is desirable that the infrared absorbance observed at either 10.05 or 10.98 microns be relatively low, preferably that there be almost no absorbance.

The iodine number of the precursor block copolymer is reduced by hydrogenation from about 200–400 down to the order of 40–280, and preferably to 50–150 by the selective hydrogenation. The iodine number here refers to the usual fat analysis method, and the units reported are in grams iodine per 100 grams of block copolymer. The iodine number of the precursor block copolymers depends on the ratio of conjugated diene polymer block to monovinyl arene polymer block, but in the products of most utility, the iodine numbers fall in the ranges quoted above before and after hydrogenation.

Addition of hydrogen halides to the aliphatic double bonds remaining in these intermediate polymers after hydrogenation is done by exposing the polymer, while dissolved in an inert solvent, to anhydrous hydrogen halide gas. After precautions are taken to exclude air from the system, the hydrogen halide gas is pressured into the reaction vessel, and reaction is allowed to proceed until hydrogen halide has added to substantially all of the aliphatic double bonds in the hydrogenated polymer. Hydrogen chloride, hydrogen bromide and hydrogen iodide are examples of hydrogen halides suitable for the purpose of this invention. Suitable solvents are alkanes, cycloalkanes and halogenated hydrocarbons. Temperatures during hydrogen halide addition may be 0°C to 100°C, but are preferably limited to 20°C to 40°C. Hydrogen halide pressures may be from about 1 atm to about 30 atm. Reaction times will generally be about 1 hour to about 1 week, though usually between 3 hours and 48 hours.

The solution of hydrohalogenated product in the reaction vessel is depressured to vent off excess hydrogen halide gas. It is then washed with water to remove dissolved hydrogen halide and recovered from solution by hot water coagulation. The wet coagulated product may be dried by milling briefly on a hot two-roll laboratory mill or it may be vacuum dried.

Alternatively, hydrogen halide may be allowed to diffuse into and add to a solid sample of selectively hydrogenated block copolymer. For example, a solid piece of polymer such as a block or film or tape may be immersed in a non-solvent at room temperature and the solvent saturated with hydrogen halide gas, or the solid block copolymer may be exposed without solvent to gaseous hydrogen halide until its aliphatic double bonds are substantially reacted.

Substantial differences in properties are apparent by comparison of block copolymer that has been selectively partially hydrogenated, then hydrochlorinated, with the same copolymer that has been hydrohalogenated without previous hydrogenation. The product that was partially hydrogenated then hydrochlorinated is a snappy rubber with good heat stability, while the product that was hydrochlorinated without intervening hydrogenation has plastic type properties, being brittle and with poor heat stability. Evidently, hydrogenation of the pendant vinyl groups to remove them as sites for cyclization makes a remarkable difference in the character of the product.

The heat and light stability of the hydrohalogenated products of this invention can be still further improved by incorporating therein stabilizers of the types normally used commercially for polyvinylchloride resins. Among the suitable stabilizers are tribasic lead sulfate-silicate, dibasic lead phthalate and barium cadmium compounds. Quantities that are effective vary with the stabilizer, but 5 phr of tribasic lead sulfate-silicate, incorporated by milling, has been found to protect the products of this invention sufficiently that they were judged to be as heat stable as stabilized polyvinyl chloride. In a typical test a stabilized, hydrochlorinated, partially hydrogenated polystyrene-polybutadiene-polystyrene block copolymer withstood milling very well and also withstood a 10 minute period at 210°C without discoloration or sign of degradation.

The fire resistance of the elastomeric hydrobrominated products of this invention is unusually good. A partially hydrogenated polystyrene-polybutadiene-polystyrene block polymer, reacted with hydrogen bromide until it contained 20 percent weight bromine, was self-extinguishing when the igniting flame was removed. No fire resistant additive was required. The hydrochlorinated polymer produced from the same partially hydrogenated precursor was self-extinguishing after a small quantity, for example, 5 percent weight of antimony trioxide or a few percent of tri(2,3-dibromopropyl) phosphate, of additive was present. In contrast, typical fire resistant homopolymer elastomeric compositions require 5–10 percent of antimony trioxide as well as 30–40 phr of a chlorinated wax, based on the rubber content, to achieve the self-extinguishing state. Such compositions also require vulcanization to become commercially useful, whereas the hydrohalogenated block copolymers have high strength when melted, formed and cooled, without requiring vulcanization.

The oxygen index, that is, the mol fraction of oxygen in the combusting gas required to support combustion of these compositions, shows clearly the advantages of products of the present invention. Normally, air, which contains 0.208 mol fraction oxygen, will support combustion of organic matter. Air will not, however, support combustion of a block copolymer of the present invention if it contains 20 percent weight combined bromine in the hydrohalogenated polymer block or if 10 or 20 percent combined chlorine is present together with 5 parts of antimony trioxide per hundred parts of polymer.

More oxygen than is normally present in atmospheric air must be present in order to support combustion of these compositions; the higher the mol fraction of oxygen (that is, the oxygen index) required, the better is the fire resistance. A comparison with two commercial materials is shown in the following table, which refers to hydrohalogenated products made from a partially hydrogenated polystyrene-polybutadiene-polystyrene block copolymer wherein the polybutadiene block had 37 percent 1,2 microstructure before hydrogenation to an iodine number of 92.

| Halogen Content, %w | Additive, Parts per Hundred parts of Polymer | Oxygen Index (a) |
|---|---|---|
| Chlorine, 10 | — | 0.17 |
| Chlorine, 10 | 5 phr $Sb_2O_3$ | 0.22 |
| Chlorine, 20 | 5 phr $Sb_2O_3$ | 0.22 |
| Bromine, 20 | — | 0.28 |
| Polyvinylchloride, | — | 0.41 |
| Polycarbonate, | — | 0.24 |

(a) Mol fraction of oxygen in gas surrounding polymer required to support combustion of a vertical sample ignited at its top in a flowing gas system ASTM Test D-2863-70.

For comparison, a commercial polyvinylchloride, which contains 57 percent combined chlorine, had an oxygen index of 0.41 and a polycarbonate, which contains 19 percent oxygen, had an oxygen index of 0.24. Both products are well advertised as fire resistant compositions. Neither of these materials is elastomeric.

EXAMPLE I

A polystyrene-polybutadiene-polystyrene three block copolymer having 46 percent 1,2 microstructure (pendant vinyl groups) in the polybutadiene block was prepared and selectively hydrogentated.

Polymerization

All monomers and solvents were treated to remove water, oxygen and polar materials, and the reaction system was thoroughly purged and blanketed with nitrogen. The reactor was charged with 4,200 g of cyclohexane and 468 g of styrene that had been titrated to scavenge reactive impurities. Then 0.031 mole of secondary butyl lithium in 275 g of cyclohexane was added to start polymerization, which converted essentially all of the styrene to polystyrene in one hour at 50°C. A 132 g sample was withdrawn for analysis.

The rest of the living polymer solution was transferred to a second reactor containing 2,160 g of butadiene, 11,535 g of cyclohexane and 50 g of tetrahydrofurane (tetrahydrofurane/lithium ratio 20:1) that had been pretitrated with secondary butyl lithium to incipient polymerization. After 3 hours further polymerization at 40°C, the butadiene was substantially all consumed to form the second block of the copolymer. A second sample was removed for analysis.

A solution of 442 g of styrene in 2,650 g of cyclohexane, pretitrated with secondary butyl lithium to incipient polymerization, was then charged to the reactor to form the third block of the copolymer. After 1 hour at 45°C polymerization was complete. A third sample was removed for analysis, and the remainder of the polymer solution was hydrogenated.

Analysis of each of the three samples removed during polymerization by a tritium method indicated the average molecular weights of the three blocks to be 13,000 – 64,000 – 15,000. The polybutadiene middle block of this polymer contained 46 percent 1,2 microstructure, using an infrared analysis based on absorbances at the wave lengths described above.

Partial Hydrogenation

The polymer solution from the polymerization step was transferred to a hydrogenation autoclave. As catalyst 6 millimoles of nickel acetylacetonate was reacted with 12 millimoles of triethyl aluminum in 1,500 ml of cyclohexane to 15 minutes at 25°C, then added to the system. The autoclave was pressured to 500 psig with hydrogen. The reaction temperature rose to 50°C, and after 25 minutes hydrogenation was stopped. The selectively hydrogenated polymer had an iodine number of 81 and substantially no remaining 1,2 microstructure.

After recovery by coagulation and drying, and molding to make typical rubber specimens, the pertinent physical properties of the partially hydrogenated polymer were:

| | |
|---|---|
| Tensile strength at break, 23°C, psi | 7,000 |
| 300% modulus, 23°C, psi | 650 |
| Elongation at break, 23°C, % | 590 |
| Set after break, 23°C, % | 20 |

EXAMPLE II

A partially hydrogenated polystyrene-polybutadiene-polystyrene block copolymer made in the same way as the polymer described in Example I was treated to add hydrogen chloride. The polymer before hydrogenation had average block molecular weights of 14,000 – 68,000 – 15,000, and 38 percent of the olefinic double bonds in the polybutadiene middle block were in pendant vinyl groups. This polymer was hydrogenated to an iodine number of 92, which substantially removed the vinyl unsaturation. The remaining olefinic double bonds were mainly trans-1,4 structured.

To 1 liter reaction vessel were charged 43 g of the above partially hydrogenated block copolymer in 270 g of cyclohexane and 300 g of dry benzene. After purging the reaction system with nitrogen, the vessel was pressured to 300 psig with anhydrous hydrogen chloride. After shaking by hand to aid solution of hydrogen chloride, the vessel was allowed to remain at 25°C for 19 hours. The excess hydrogen chloride was vented off and the polymer solution was washed with water to remove dissolved hydrogen chloride. The polymer was recovered by coagulation with isopropanol and dried in vacuo. The 47 g of product contained 10.4 percent weight chlorine, which is so close to the theoretical quantity of chlorine (11 percent weight), calculated for complete reaction of all remaining double bonds that little isomerization and cyclization could have occurred. Five parts per hundred parts of polymer of tribasic lead silicate-sulfate was incorporated with the polymer, which was then milled briefly on a laboratory two-roll rubber mill at 180°C. The product was a thermoplastic rubber and did not require vulcanization. It was compression-molded at 200°C to prepare rubber-type test specimens. When pulled by hand, the products were typical snappy rubbers. These specimens had the following properties when tested by rubber testing techniques:

| | |
|---|---|
| Tensile strength, 23°C, psi | 4,300 |
| 300% Modulus, 23°C, psi | 700 |
| Elongation at break, 23°C, % | 540 |
| Set after break, 23°C, % | 25 |

While this product was not self-extinguishing when ignited, it became self-extinguishing after incorporating only a small amount (5 percent weight) of antimony trioxide.

EXAMPLE III

In this experiment hydrogen chloride was added to an unhydrogenated polystyrene-polybutadiene-polystyrene block copolymer. The polymer used was the same base polymer described in Example II but was not hydrogentated.

To a 1 liter vessel, 30 g of block copolymer in 570 g of benzene were charged. After purging with nitrogen and pressuring to 300 psig with anhydrous hydrogen chloride, the vessel was shaken briefly by hand, then allowed to stand at 25°C for 23 hours. Excess hydrogen chloride was vented off, the polymer was washed with water and then coagulated with isopropanol and dried to obtain a product containing 17 percent weight chlorine. Since the theoretical chlorine content for complete hydrochlorination was 31 percent, one must conclude that considerable cyclization had occurred, destroying double bonds before hydrogen chloride could react.

After stabilizing with basic lead silicate-sulfate, attempted molding at 160°C resulted in severe decomposition and gave a brown, brittle specimen. Films cast from CCl$_4$ were stiff and boardy. It is evident that the hydrogenation step is a very important preliminary to achieve satisfactory properties after hydrohalogenation.

EXAMPLE IV

Hydrogen bromide was added to the same partially hydrogentated polystyrene-polybutadiene-polystyrene block copolymer described in Example II. To a 1 liter vessel 32 g of polymer dissolved in 620 g dry benzene was charged and purged with nitrogen. The reaction vessel was pressured to 150 psig with anhydrous hydrogen bromide, and was shaken briefly to promote solution of the hydrogen bromide gas. Reaction then proceeded at room temperature for 24 hours. Excess hydrogen bromide was removed by venting, the polymer solution was washed with water, coagulated with isopropanol and dried. The 39 g of polymer recovered contained 19.9 percent weight bromine, and substantially no remaining olefinic double bonds.

A film of this product cast from tetrahydrofurane was a snappy rubber with the following properties when tested by rubber testing techniques:

| | |
|---|---|
| Tensile strength, 23°C, psi | 6,000 |

| | |
|---|---|
| 300% Modulus, 23°C, psi | 1,500 |
| Elongation at Break, 23°C, % | 360 |
| Set after Break, 23°C, % | 19 |

This product was self-extinguishing when it was ignited and the source of ignition was removed. No additives were required to improve its self-extinguishing properties, so that this polymer achieved very well the objects of the invention.

I CLAIM AS MY INVENTION:

1. A partially hydrogenated and hydrohalogenated block copolymer having, prior to hydrogenation and hydrohalogenation, at least one monovinyl arene polymer block and at least one polybutadiene block wherein the polybutadiene block prior to hydrogenation has between about 20 and about 60 percent 1,2 microstructure showing infrared absorbance at 10.98 microns and 10.05 microns, the balance being 1,4 microstructure, said block copolymer being selectively hydrogenated at 20° – 50°C under 50 – 500 psig hydrogen pressure for 0.1–1 hour to remove at least about 50% of the unsaturation in the 1,2 microstructure and no more than about 50 percent of the unsaturation in the 1,4 microstructured portion of the polybutadiene block, and then substantially completely reacted in the polybutadiene block with a hydrogen halide selected from the group hydrogen chloride, hydrogen bromide and hydrogen iodide at 0°–100°C under 1–30 atmospheres hydrogen halide pressure for 1–168 hours.

2. A hydrohalogenated and partially hydrogenated block copolymer according to claim 1 having a structure prior to hydrogenation and hydrohalogenation of A—B wherein A is a monovinyl arene polymer block and B is a butadiene polymer block.

3. A partially hydrogenated and hydrohalogenated block copolymer according to claim 1 having the general structure prior to hydrogenation and hydrohalogenation of A—B—A wherein A is a monovinyl arene polymer block and B is a butadiene polymer block.

4. A partially hydrogenated and hydrohalogenated block copolymer according to claim 1 having the general structure prior to hydrogenation and hydrohalogenation of A—(—B—A)$_{1-5}$ wherein A is a monovinyl arene polymer block and B is a butadiene polymer block.

5. A partially hydrogenated and hydrohalogenated block copolymer according to claim 1 having the general structure prior to hydrogenation and hydrohalogenation of A—B—(—B—A)$_{1-5}$ wherein A is a monovinyl arene polymer block and B is a butadiene polymer block.

6. A partially hydrogenated and hydrohalogenated block polymer according to claim 5 in which each A is a poly(alphamethylstyrene) block.

7. A partially hydrogenated and hydrohalogenated block polymer according to claim 1 having the structure prior to hydrogenation and hydrohalogenation of polystyrene-polybutadiene-polystyrene.

* * * * *